(12) United States Patent
Tautz

(10) Patent No.: US 10,175,659 B2
(45) Date of Patent: Jan. 8, 2019

(54) CONTROL DEVICE FOR A HYDRAULIC CYLINDER UNIT HAVING OPTIMIZED LINEARIZATION

(71) Applicant: Primetals Technologies Germany GmbH, Erlangen (DE)

(72) Inventor: Wilfried Tautz, Forchheim (DE)

(73) Assignee: PRIMETALS TECHNOLOGIES GERMANY GMBH (DE)

( * ) Notice: Subject to any disclaimer, the term of this patent is extended or adjusted under 35 U.S.C. 154(b) by 148 days.

(21) Appl. No.: 15/304,983

(22) PCT Filed: Mar. 25, 2015

(86) PCT No.: PCT/EP2015/056412
§ 371 (c)(1),
(2) Date: Oct. 18, 2016

(87) PCT Pub. No.: WO2015/161979
PCT Pub. Date: Oct. 29, 2015

(65) Prior Publication Data
US 2017/0212481 A1    Jul. 27, 2017

(30) Foreign Application Priority Data
Apr. 25, 2014 (EP) .................................... 14165962

(51) Int. Cl.
*G05B 11/38* (2006.01)
*G05D 7/06* (2006.01)
*G05B 11/36* (2006.01)

(52) U.S. Cl.
CPC .............. *G05B 11/38* (2013.01); *G05B 11/36* (2013.01); *G05D 7/0635* (2013.01)

(58) Field of Classification Search
CPC .............................. G05B 11/38; G05D 7/0635
See application file for complete search history.

(56) References Cited

U.S. PATENT DOCUMENTS

2010/0294125 A1* 11/2010 Tautz ................. F15B 9/09
91/363 R
2012/0221219 A1* 8/2012 Murata ............... F16H 61/143
701/60

FOREIGN PATENT DOCUMENTS

WO    WO 2009/056378 A2    5/2009
WO    WO 2011/000 856 A2    1/2011

OTHER PUBLICATIONS

International Search Report dated Sep. 9, 2015 issued in corresponding International patent application No. PCT/EP2015/056412.
(Continued)

*Primary Examiner* — Yuhui R Pan
(74) *Attorney, Agent, or Firm* — Ostrolenk Faber LLP

(57) ABSTRACT

A controller (15) which receives a target value (g*) related to a piston (3) of the hydraulic cylinder unit (1) and an actual value (g) related to the piston (3) of the hydraulic cylinder unit (1). On the basis of the difference (δg) of the values, the controller determines a provisional manipulated variable (u'). A linearization unit (17) downstream of the controller (15) multiplies the provisional manipulated variable (u') by a linearization factor (F) and outputs the product to a valve control unit (7) as a final manipulated variable (u) such that the actual value (g) is brought toward the target (g*) at an adjustment speed. On the basis of working pressures (pA, pB) on both sides of the piston (3) and/or working pressures (pP, pT) on the feed side and on the outflow side of the valve control unit (7) and a target piston force (FKL) to be applied by the piston (3), the linearization unit (17) determines target values (pA*, pB*) for the working pressures (pA, pB). The linearization unit determines the linearization factor (F) dynamically as a function of an actual position(s) of the (Continued)

piston (3), the target values (pA*, pB*), and the working pressures (pP, pT) on the feed side and on the outflow side of the valve control unit (7).

13 Claims, 8 Drawing Sheets

(56) References Cited

OTHER PUBLICATIONS

Written Opinion dated Sep. 9, 2015 issued in corresponding International patent application No. PCT/EP2015/056412.

* cited by examiner

CONTROL DEVICE FOR A HYDRAULIC CYLINDER UNIT HAVING OPTIMIZED LINEARIZATION

CROSS-REFERENCE TO RELATED APPLICATIONS

The present application is a 35 U.S.C. §§ 371 national phase conversion of PCT/EP2015/056412, filed Mar. 25, 2015, which claims priority of European Patent Application 14165962.3, filed Apr. 25, 2014, the contents of which are incorporated by reference herein. The PCT International Application was published in the German language.

The present invention proceeds from a control device for controlling a hydraulic cylinder unit,
- wherein the control device comprises a controller having an input side which receives a setpoint variable related to a piston of the hydraulic cylinder unit and an actual variable related to the piston of the hydraulic cylinder unit and establishes a preliminary manipulated variable for a valve control unit of the hydraulic cylinder unit on the basis of the difference between setpoint variable and actual variable,
- wherein a linearization unit is disposed downstream of the controller, the linearization unit multiplying the preliminary manipulated variable by a linearization factor and outputting the preliminary manipulated variable multiplied by the linearization factor to the valve control unit as a final manipulated variable such that the actual variable tracks the setpoint variable with an adjustment speed.

Alternatively, the present invention proceeds from a control device for controlling a hydraulic cylinder unit,
- wherein the control device has a controller which is embodied as a P controller, which receives a controlled variable on the input side, establishes a manipulated variable for a valve control unit of the hydraulic cylinder unit on the basis of the controlled variable and outputs the manipulated variable to the valve control unit such that an actual variable relating to a piston of the hydraulic cylinder unit tracks a setpoint variable relating to the piston with an adjustment speed,
- wherein a linearization unit is disposed upstream of the controller, the linearization unit receiving the setpoint variable and the actual variable, multiplying the difference thereof by a linearization factor and outputting the difference multiplied by the linearization factor as controlled variable to the controller.

Hydraulic cylinder units exhibit a control response which is strongly dependent on the operating point of the hydraulic cylinder unit. A controller for a hydraulic cylinder unit which was optimized for a specific operating point operates less well or badly at other operating points.

For the purposes of improving the control response, the prior art in accordance with WO 2009/056 378 A2 has disclosed the practice of disposing a linearization unit upstream or downstream of the controller. The linearization unit from WO 2009/056 378 A2 determines the linearization factor dynamically as a function of an actual position of the piston, working pressures prevailing on both sides of the piston and working pressures prevailing on the inflow side and outflow side of the valve control unit. The linearization unit determines the linearization factor in such a way that a ratio of the adjustment speed of the actual variable to the difference between setpoint variable and actual variable is independent of the actual position of the piston, the working pressures prevailing on both sides of the piston and the working pressures prevailing on the inflow side and outflow side of the valve control unit.

The procedure in accordance with WO 2009/056 378 A2 already represents a significant advance. However, practice has shown that this procedure is also still afflicted by disadvantages.

One disadvantage consists of the working pressures on both sides of the piston being used both in the hydraulic system and in the linearization. Although the linearization compensates the effect in the hydraulic system, this is delayed by the valve control unit. By way of example, as result of this, a manipulated variable which should cause an increase in force generates a lower increase in force than expected. The deviation from the expected force increase becomes ever larger, the greater the manipulated variable is (following error). Consequently, the control has reduced dynamics.

A further disadvantage consists of a manipulated variable, which moves the piston of the hydraulic cylinder unit at a certain speed, being modulated by changes in force (changes in pressure) by way of the linearization. Such modulation corresponds to a positive force feedback (direct feedback, positive feedback). Consequently, the control is destabilized.

SUMMARY OF THE INVENTION

The object of the present invention consists of developing options by means of which the disadvantages of the prior art are removed.

According to the invention, a control device of the type set forth at the outset is configured in such a way
- that the linearization unit establishes setpoint values for the working pressures prevailing on both sides of the piston on the basis of working pressures prevailing on both sides of the piston and/or working pressures prevailing on the inflow side and outflow side of the valve control unit and a setpoint piston force to be exerted by the piston,
- that the linearization unit dynamically determines the linearization factor as a function of an actual position of the piston, the setpoint values for the working pressures prevailing on both sides of the piston and the working pressures prevailing on the inflow side and outflow side of the valve control unit.

Thus, according to the invention, the linearization factor is not established on the basis of the working pressures prevailing on both sides of the piston themselves, but rather on the basis of setpoint values for the working pressures, which are established from the working pressures in conjunction with a setpoint piston force. Preferably, the linearization unit determines the linearization factor in such a way that a ratio of the adjustment speed of the actual variable to the difference between setpoint variable and actual variable is independent of the actual position of the piston, the working pressures prevailing on both sides of the piston and the working pressures prevailing on the inflow side and outflow side of the valve control unit.

In principle, the controller can be embodied as any controller. However, in many cases, it is sufficient for the controller to be embodied as a P controller (=proportional controller).

In the special case where the controller is embodied as a P controller, the sequence of controller and linearization unit may be interchanged. Therefore, the configuration according to the invention must, however, be adapted by virtue of, in this case, the linearization unit multiplying the difference between setpoint variable and actual variable by the linearization function and feeding the difference multiplied by the linearization factor to the controller as the input variable thereof. The manner of establishing the linearization factor remains unchanged, however.

It is possible for the setpoint variable and the actual variable to be positions of the piston of the hydraulic cylinder unit. In this case, the control device preferably establishes the setpoint piston force on the basis of an inherent force and an adjustment force, wherein the inherent force is determined by an inherent weight of a mass moved by means of the piston and the control device establishes the adjustment force on the basis of a variable output by the controller, from which, by way of filtering, the preliminary setpoint variable or the final setpoint variable is established. This configuration leads to a simple, reliable controller structure in the case of a position controller.

Alternatively, it is possible for the setpoint variable to be a setpoint load force and the actual variable to be an actual load force exerted by the hydraulic cylinder unit onto a load. In this case, the control device preferably establishes the setpoint piston force on the basis of an inherent force and the setpoint variable, wherein the inherent force is determined by an inherent weight of a mass moved by means of the piston.

Preferably, the control device establishes a force setpoint value in the last-mentioned case on the basis of the inherent force and the setpoint variable and, thereupon, the setpoint piston force by delaying the force setpoint value by means of a time-delay member. By way of example, the time-delay member may be embodied as a PT1 member, as a PT2 member, as a dead time constant and more of the same. An embodiment as PT2 member is preferred.

In accordance with the relationship $$FKL = pA^* \cdot AKA + pB^* \cdot AKB, \quad (1)$$

the setpoint piston force supplies a condition for establishing the setpoint values. FKL is the setpoint piston force. pA* and pB* are the setpoint values of the working pressures prevailing on both sides of the piston. AKA and AKB are the effective working faces in each case. However, a further equation is required for uniquely determining the setpoint values pA* and pB*. In practice, it was found to be expedient for the control device to establish the setpoint values for the working pressures prevailing on both sides of the piston in such a way that the sum of the setpoint values equals a linear combination of the sum of the working pressures prevailing on both sides of the piston and the sum of the working pressures prevailing on the inflow side and outflow side of the valve control unit. Thus, if pA and pB denote the working pressures prevailing on both sides of the piston and pP and pT denote the working pressures prevailing on the inflow side and outflow side of the valve control unit, the following relationship preferably furthermore applies in addition to the equation above:

$$pA^* + pB^* = \alpha \cdot (pA + pB) + (1-\alpha) \cdot (pP + pT), \quad (2)$$

where α is a weighting factor, which lies between 0 and 1. The limits themselves, i.e. the values 0 and 1, may likewise be assumed.

If, in practice, the control device restricts the setpoint values for the working pressures prevailing on both sides of the piston to values between the working pressures prevailing on the inflow side and outflow side of the valve control unit, then this furthermore leads to a more stable linearization.

A further measure which contributes to stabilizing the linearization consists of the control device smoothing the working pressures prevailing on both sides of the piston prior to establishing the setpoint values for the working pressures prevailing on both sides of the piston. By way of example, a time constant, with which the smoothing is effected, may lie between e.g. 10 ms and 1000 ms, preferably between 30 ms and 300 ms. In particular, a value of approximately 100 ms was found to be advantageous.

The control device may be embodied as a hardware structure. However, it is preferably embodied as a software programmable control device and programmed by a software module such that it is embodied as a control device according to the invention on account of the programming with the software module.

The software module comprises machine code, the processing of which by a software programmable control device linked to a hydraulic cylinder unit causes the control device to be embodied as a control device according to the invention. The software module may be stored on a data medium in machine-readable form (in particular in electronic form).

The above-described properties, features and advantages of this invention, and the manner in which they are achieved, will become clearer and more easily understandable in conjunction with the following description of the exemplary embodiments, which are explained in more detail in conjunction with the drawings. Here, in a schematic illustration:

DESCRIPTION OF EMBODIMENTS

Figure 1:
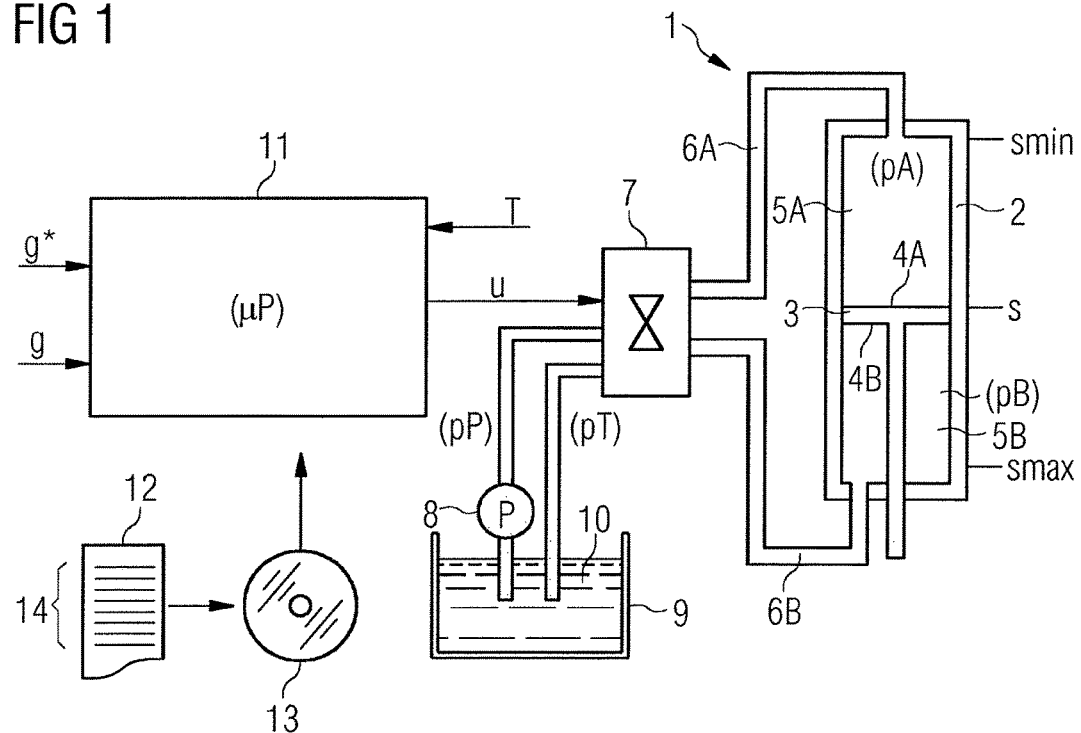
FIG. 1 shows a block diagram of a control device and a hydraulic cylinder unit.

In accordance with FIG. 1, a hydraulic cylinder unit 1 comprises a hydraulic cylinder 2, in which a piston 3 is mounted in a movable fashion. The piston 3 is movable within the hydraulic cylinder 1 between a minimum position smin and a maximum position smax. Thus, it is at an actual position s, which lies between the minimum position smin and the maximum position smax, at all times.

The piston 3 has a first working face 4A and a second working face 4B. Each working face 4A, 4B faces a corresponding working volume 5A, 5B.

The working volumes 5A, 5B are hydraulically connected to a hydraulic pump 8 and a hydraulic reservoir 9 via hydraulic paths 6A, 6B and a valve control unit 7. The hydraulic paths 6A, 6b extend from the respective working volume 5A, 5B to the valve control unit 7.

A certain volume of a hydraulic liquid 10 is situated in the hydraulic path 6A when the piston 3 is situated in its minimum position smin. This volume is the minimum amount of hydraulic liquid 10 which is situated between the valve control unit 7 and the working face 4A of the piston 3. This amount of hydraulic liquid 10 is the minimum possible effective volume for the working volume 5A. Below, it is denoted by the reference sign VminA.

A certain amount of hydraulic liquid 10 is analogously situated in the hydraulic path 6B when the piston 3 is situated in its maximum position smax. This amount of hydraulic liquid 10 constitutes a minimum possible effective volume for the working volume 5B. Below, this minimal volume is denoted by the reference sign VminB.

When the piston 3 is situated in any actual position s, the working volume 5A has an effective volume value VA, which emerges as $$VA = VminA + AKA \cdot (s - smin). \quad (3)$$

The reference sign AKA denotes the area of the working face 4A of the piston 3 facing the working volume 5A.

It is possible to divide the effective volume VA by the area AKA. The quotient $$ha = VA/AKA \quad (4)$$

corresponds to an effective height of a column of the hydraulic liquid 10 over the piston 3.

Analogously, the minimum possible effective volume VminB for the working volume 5B, the area AKB of the working face 4B facing the working volume 5B, the actual position s and the maximum position smax can be used in accordance with the relationships $$VB = VminB + AKB \cdot (smax - s) \quad (5)$$

and $$hB = VB/AKB \quad (6)$$

to establish corresponding values VB and hB for the second working face 4B and the second working volume 5B.

A first working pressure pA prevails in the working volume 5A; a second working pressure pB prevails in the second working volume 5B. The hydraulic liquid 10 is actuated by a pump pressure pP by way of the hydraulic pump 8. A reservoir pressure pT prevails in the hydraulic reservoir 9. The pump pressure pP corresponds to a working pressure prevailing on the inflow side of the valve control unit 7. The reservoir pressure pT corresponds to a working pressure prevailing on the outflow side of the valve control unit 7.

The valve control unit 7 is embodied in the present case as a four-way valve. By means of a four-way valve it is possible to connect the pump 8 or the hydraulic reservoir 9 alternatively to each of the two working volumes 5A, 5B. The valve control unit 7 could alternatively be embodied as a two-way valve. In this case, a constant pressure, for example half the pump pressure pP, would be applied to one of the two working volumes 5A, 5B. The pump 8 or the hydraulic reservoir 9 can alternatively be connected to the other working volume 5A, 5B in this case.

The valve control unit 7, and with it the entire hydraulic cylinder unit 1, is controlled by means of a control device 11. The control device 11 is preferably embodied according to FIG. 1 as a software programmable control device 11. The control device 11 is therefore programmed by means of a software module 12. The software module 12 can be fed to the control device 11, for example by means of a data medium 13 on which the software module 12 is stored in machine-readable form. In principle, any data medium is possible here as the data medium 13. A CD-ROM 13 is illustrated (purely by way of example) in FIG. 1.

The software module 12 comprises a machine code 14 which can be processed by the control device 11. The processing of the machine code 14 by the control device 11 has the effect that the control device 11 controls the hydraulic cylinder unit 1 in the way explained in more detail below. The programming of the control device 11 with the software module 12 brings about the corresponding embodiment of the control device 11.

In accordance with FIG. 1, the control device 11 is initially fed a setpoint variable g* related to the piston 3 of the hydraulic cylinder unit 1 and an actual variable g related to the piston 3 of the hydraulic cylinder unit 1. The setpoint variable g* and the actual variable g are typically positions of the piston 3 or forces acting on the piston 3. In a manner yet to be explained below, the control device 11 establishes a manipulated variable u for the valve control unit 7 on the basis of the setpoint variable g* and the actual variable g and outputs the manipulated variable u to the valve control unit 7. As a result, the control device 11 carries out the closed-loop control of the hydraulic cylinder unit 1 (more precisely: of the piston 3).

Figure 2:
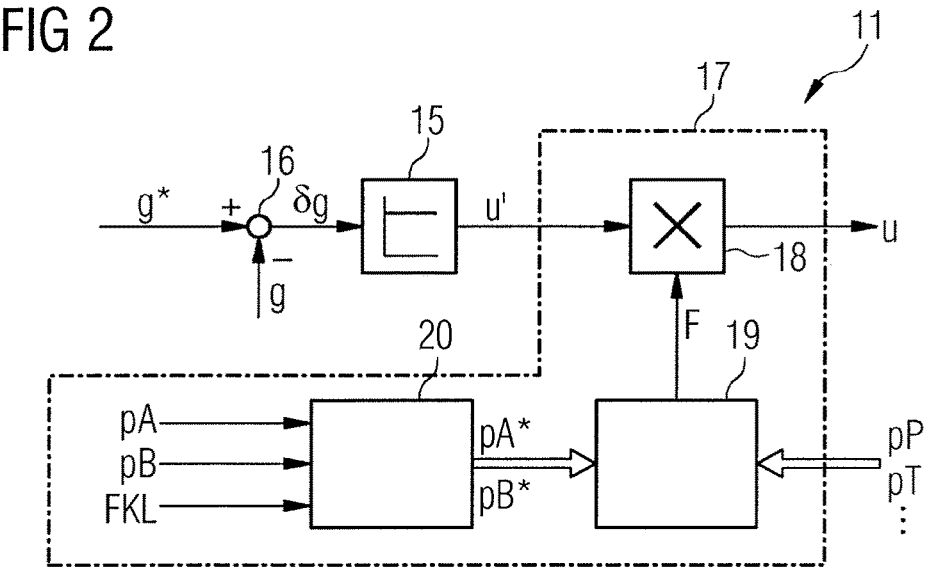
FIG. 2 shows a first configuration of the control device.

The control device 11 is preferably embodied in accordance with FIG. 2. In accordance with FIG. 2, the control device 11 has a controller 15, which receives, on the input side, the setpoint variable g* and the actual variable g. The difference δs between setpoint variable g* and actual variable g is formed at a node 16. This difference is subsequently referred to as control difference δg.

The control difference δg is fed to the controller 15, which establishes a preliminary manipulated variable u' for the valve control unit 7 on the basis of the control difference δg. In accordance with FIG. 2, the controller 15 is preferably embodied as a P controller.

A linearization unit 17 is disposed downstream of the controller 15. The linearization unit 17 comprises a multiplier and an establishment device 19. In a manner yet to be explained below, the establishment device 19 determines a linearization factor F and outputs the linearization factor F to the multiplier 18. The multiplier 18 moreover receives the preliminary manipulated variable u' from the controller 15 and multiplies the preliminary manipulated variable u' by the linearization factor F. In this manner, the linearization unit 17 establishes a final manipulated variable u, which is output to the valve control unit 7.

The valve control unit 7 is set in accordance with the manipulated variable u transmitted thereto. What this brings about is that the piston 3 is displaced or adjusted or the working pressures pA, pB are set or, in general, the actual variable g tracks the setpoint variable g* with the adjustment speed.

In the configuration in accordance with FIG. 2, the controller 15 may, in principle, be any type of controller. However, a configuration of the controller 15 as a P controller is generally sufficient and also preferred.

Figure 3:
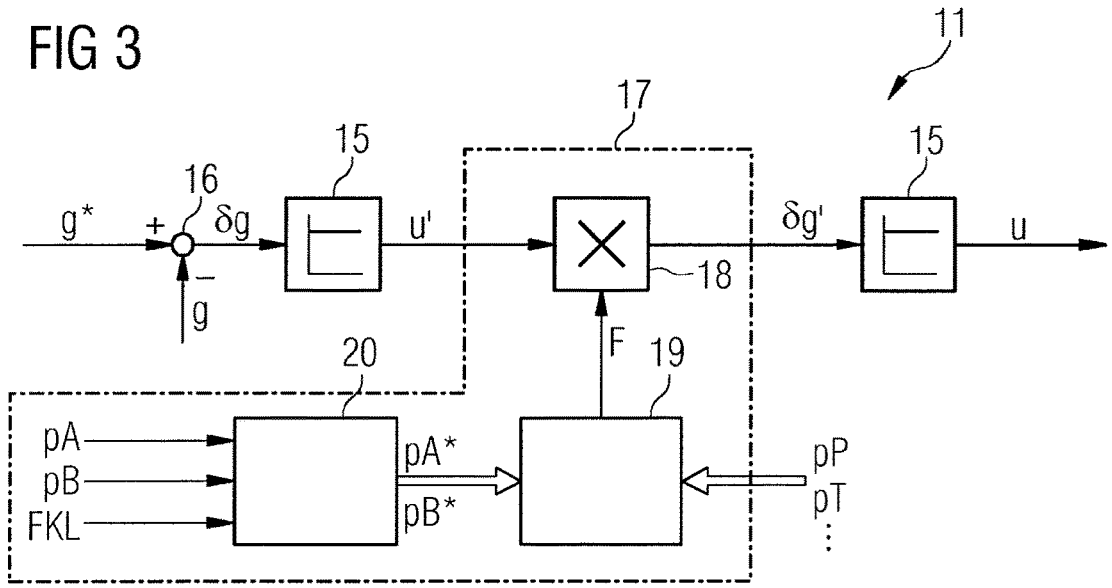
FIG. 3 shows a second configuration of the control device.

As an alternative to the configuration in accordance with FIG. 2, it is possible, in accordance with FIG. 3, to swap the sequence of controller 15 and linearization unit 17. In this case, the configuration of the controller 15 as P controller is mandatory. Otherwise, the mode of operation of the configuration in accordance with FIG. 3 is completely analogous to the configuration in accordance with FIG. 2. It is therefore possible to omit detailed explanations in relation to FIG. 3.

The linearization unit 17 has a setpoint value establishment unit 20. The working pressures pA, pB prevailing on both sides of the piston 3 and a setpoint piston force FKL to be exerted by the piston 3 are fed to the setpoint value establishment unit 20. On the basis of the working pressures pA, pB prevailing on both sides of the piston 3 and the setpoint piston force FKL, the setpoint value establishment unit 20 establishes setpoint values pA*, pB* for the working pressures pA, pB prevailing on both sides of the piston 3. The setpoint value establishment unit 20 feeds the setpoint values pA*, pB* for the working pressures pA, pB prevailing on both sides of the piston 3 to the establishment device 19. It is possible that the setpoint value establishment unit 20 establishes the setpoint values pA*, pB* for the working pressures pA, pB prevailing on both sides of the piston 3 only on the basis of the setpoint piston force FKL and the working pressures pA, pB prevailing on both sides of the piston 3. Alternatively, it is possible for the setpoint value establishment unit 20 to additionally take account of the working pressures pP, pT prevailing on the inflow side and outflow side of the valve control unit 7 as well.

The establishment device 19 determines the linearization factor F dynamically as a function of the actual position s of the piston 3, the setpoint values pA*, pB* for the working pressures pA, pB prevailing on both sides of the piston 3 and of the working pressures pP, pT prevailing on the inflow side and outflow side of the valve control unit 7. The establishment device 19 determines the linearization factor F in such a way that a ratio of the adjustment speed of the actual variable g to the difference δg between setpoint variable g* and actual variable g is independent of the actual position s of the piston 3, the working pressures pA, pB prevailing on both sides of the piston 3 and the working pressures pP, pT prevailing on the inflow side and outflow side of the valve control unit 7.

A preferred mode of operation of the establishment device 19 is explained in more detail below in conjunction with FIG. 4.

The control device 11 is usually clocked with a working clock T in accordance with FIG. 1. The control device 11 receives in each case a new setpoint variable g* and a new actual variable g with the frequency of the working clock T, establishes the manipulated variable u and outputs the manipulated variable u to the valve control unit 7.

Figure 4:
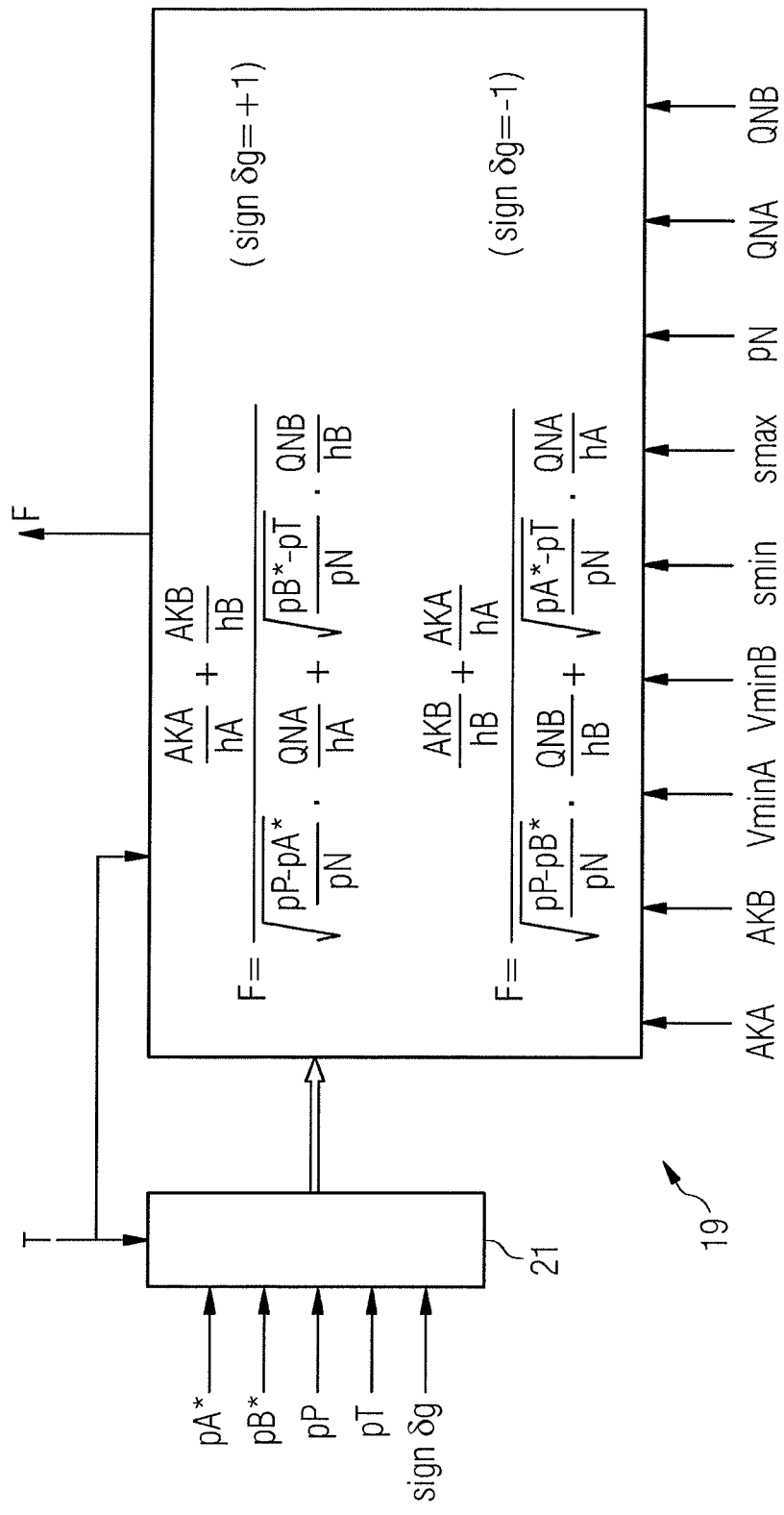
FIG. 4 shows an establishment device of a linearization unit.

In accordance with FIG. 4, new values for the actual position s and the setpoint values pA*, pB* for the working pressures pA, pB prevailing on both sides of the piston 3 are likewise fed to the establishment device 19 with the working clock T in each case. Furthermore, the sign of the control difference δg is fed to the establishment device 19. The clocked feeding of these variables s, pA, pB, sign δg is indicated in FIG. 4 by a latch 21, which is clocked with the working clock T, being disposed upstream of the establishment device 19.

The pump pressure pP and the reservoir pressure pT are generally constant. It is therefore possible to feed these two pressures pP, pT to the establishment device 19 once (i.e. in advance and therefore as a parameter). Alternatively, it is possible to feed the inflow-side working pressure pP and the outflow-side working pressure pT to the establishment device 19 in a clocked fashion with the working clock T in accordance with the illustration in FIG. 4, and therefore as a variable.

As a rule, the establishment device 19 requires further data for the calculation of the linearization factor F. The further data generally comprise power data pN, QNA, QNB of the valve control unit 7, the working faces AKA, AKB which are effective on both sides of the piston 3, and the minimum possible effective volumes VminA, VminB on both sides of the piston 3. These values can be permanently predefined to the establishment device 19, for example by means of the software module 12. Alternatively, the further data can be predefined, at least partially, for the establishment device 19 after the programming of the control device 11 (i.e. within the scope of the activation of the control device 11) as parameters which are retained unchanged during the operation of the control device 11.

The linearization factor F is dependent on the sign of the control difference δg. Below, the assumption is made that the control difference δg is positive (sign δg=+1). Hence, the piston 3 should be displaced in the positive direction, i.e. in the direction of the maximum position smax, in the case of position control. Hence, a force acting in the positive direction should be increased or a force acting in the negative direction should be decreased in the case of force control.

If the control difference δg is positive, the establishment device 19 preferably determines the linearization factor F as $$F = K \cdot \frac{\frac{AKA}{hA} + \frac{AKB}{hB}}{\sqrt{\frac{pP - pA^*}{pN}} \cdot \frac{QNA}{hA} + \sqrt{\frac{pB^* - pT}{pN}} \cdot \frac{QNB}{hB}} \tag{7}$$

K is a freely selectable, constant scaling factor. The other variables used in the formula above—with the exception of the power data pN, QNA, QNB of the valve control unit 7—are already defined. The power data pN, QNA and QNB of the valve control unit 7 have the following meaning:

pN is a (basically any) nominal pressure. It corresponds to a reference pressure to which the variables QNA, QNB relate.

QNA is a rated volume flow which flows into the working volume 5A when a difference between the pump pressure pP and the working pressure pA prevailing in the working volume 5A is equal to the nominal pressure pN.

QNB is a rated volume flow which flows out of the working volume 5B when a difference between the working pressure pB and the reservoir pressure pT is equal to the nominal pressure pN.

As already mentioned, the linearization factor F is dependent on the sign of the control difference δg. If the control difference δg is negative (sign δg=−1), the linearization factor F emerges as $$F = K \cdot \frac{\frac{AKB}{hB} + \frac{AKA}{hA}}{\sqrt{\frac{pP - pB^*}{pN}} \cdot \frac{QNB}{hB} + \sqrt{\frac{pA^* - pT}{pN}} \cdot \frac{QNA}{hA}}. \tag{8}$$

The establishment device 19 preferably calculates both values and selects the correct linearization factor F on the basis of the sign of the control difference δg.

Figure 5:
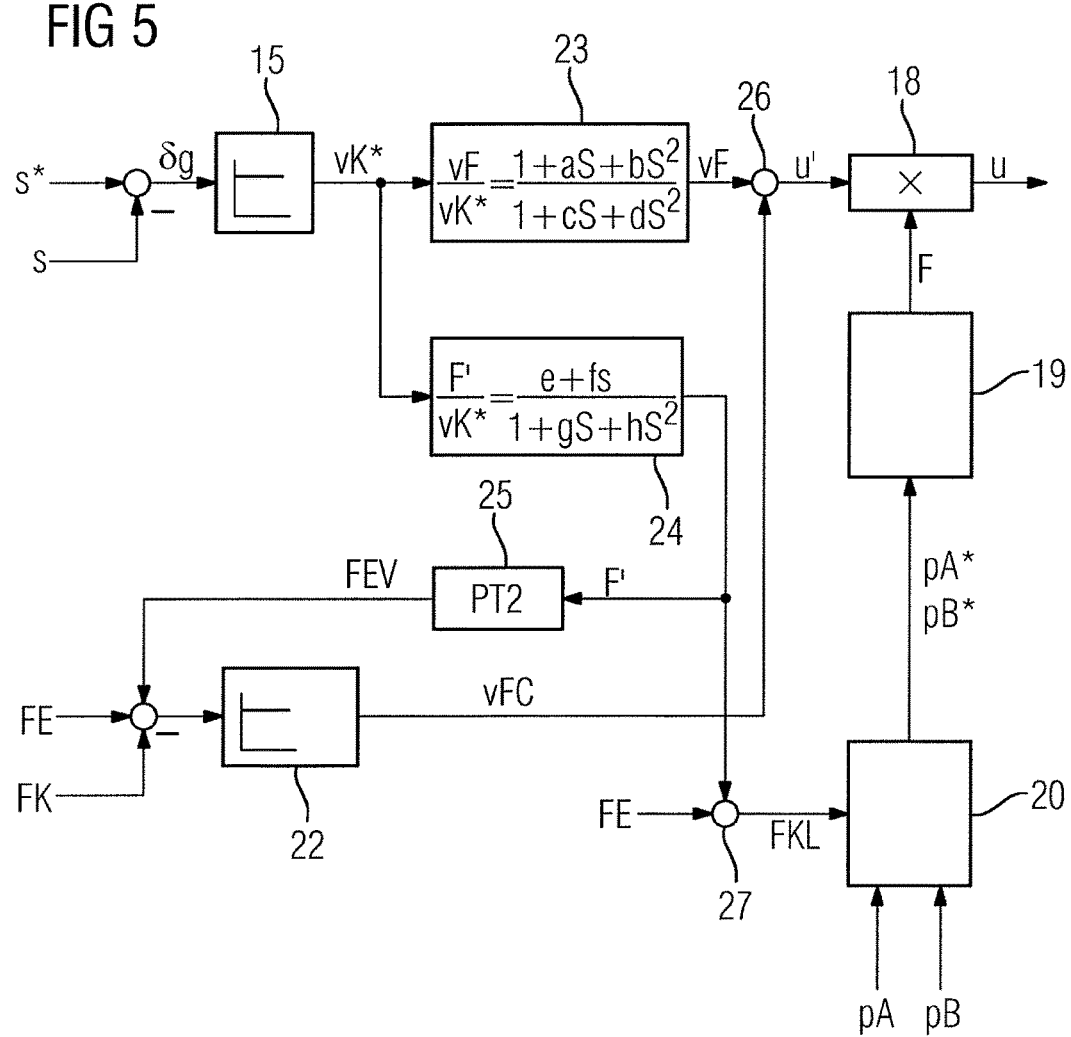
FIG. 5 shows a possible configuration of the control device in the case of a position control.

FIG. 5 shows a possible configuration of the control device 11 for the case where the setpoint variable g* and the actual variable g are the positions or situations s*, s of the piston of the hydraulic cylinder unit 1. In this case, the adjustment speed of the actual variable is the (mechanical) speed at which the piston 3 is displaced.

In the case of the configuration of FIG. 5, the controller 15 acts as position controller. Additionally, the control device 11 has a force controller 22, a first speed filter 23, a second speed filter 24 and a time-delay member 25.

A setpoint position s* is fed to the position controller 15 as setpoint variable g*. The setpoint position s* is the position which is intended to be driven to by the piston 3 of the hydraulic cylinder unit 1. Furthermore, the actual position s is fed to the position controller 15 as actual variable g. The controller 15 establishes a setpoint speed signal vK* on the basis of the setpoint position s* and the actual position s. The setpoint speed signal vK* preferably comprises a proportional component, i.e. a component which is proportional to the control difference δg. It is possible that the setpoint speed signal vK* only has the proportional component. Alternatively, the setpoint speed single vK* may additionally comprise an integral component and/or a differential component.

The setpoint speed signal vK* is fed to the first speed filter 23. The first speed filter 23 is used to filter the setpoint speed signal vK* to form a filtered speed signal vF. The first speed filter 23 is preferably configured in such a way that natural vibrations of the hydraulic system are excited as little as possible. As a rule, it has a time-delay member (not depicted here)—e.g. a PT2 member—internally and furthermore takes account of the required acceleration components and friction components which occur in the hydraulic cylinder unit 1.

A filter characteristic of the first speed filter 23 can be configured as required. In trials it was found to be advantageous if the first speed filter 23 has a filter characteristic which satisfies the relationship $$\frac{vF}{vK^*} = \frac{1 + a \cdot S + b \cdot S^2}{1 + c \cdot S + d \cdot S^2}. \tag{9}$$

In the formula specified above, S is the Laplace operator. a, b, c and d are parameters.

The speed signal vF filtered by means of the first speed filter 23 is fed to a node 26, which is furthermore supplied with a force controller output signal vFC. The filtered speed signal vF and the force controller output signal vFC are summed in the note 26 to form a summed signal. In comparison with FIG. 2, and corresponding to the illustration in FIG. 5, the summed signal corresponds to the preliminary manipulated variable u'. The procedure in accordance with FIG. 5 may also be applied to the configuration in accordance with FIG. 3. In this case, the summed signal corresponds to the manipulated variable u.

An expected adjustment force FEV, a piston force FK and an inherent force FE are fed to the force controller 22. The piston force FK is the force which is exerted by the hydraulic cylinder unit 1 onto the piston 3. It emerges from the effective piston faces AKA, AKB of the piston 3 and the working pressures pA, pB acting on the effective faces AKA, AKB. The inherent force FE takes account of, in particular, the weight force which is determined by an inherent weight of the mass moved by means of the piston 3. The force controller 14 establishes the force controller output signal vFC on the basis of the expected adjustment force FEV, the piston force FK and the inherent force FE.

The force controller 22 stabilizes the hydraulic system. It is preferably embodied as a controller with a differential behavior such that the force controller output signal vFC becomes zero in the stationary state of the hydraulic cylinder unit 1.

The expected adjustment force FEV is the force which is expected on account of friction forces and accelerations. It is established by the control device 11 on the basis of the variable vK* output by the controller 15. In particular, it is established by virtue of the setpoint speed signal vK* initially being filtered by means of the second speed filter 24 to form an adjustment force F' and thereupon being delayed by means of the time-delay member 25.

As an output signal, the second speed filter 24 supplies the sum of acceleration force and friction force. To this end, a filter characteristic of the second speed filter 16 may be embodied according to requirements. In trials, it was found to be advantageous for the filter characteristic of the second speed filter 16 to satisfy the relationship $$\frac{F'}{vK^*} = \frac{e + f \cdot S}{1 + g \cdot S + h \cdot S^2}. \tag{10}$$

In the relationship above, F' is the output signal of the second speed filter. vK* is the setpoint speed signal. S is, once again, the Laplace operator. e, f, g and h are parameters.

Furthermore, at least one of the following relationships applies in many cases. It is often even the case that all of the following relationships apply:

$$d = c^2/2 \tag{11}$$

$$h = g^2/2 \tag{12}$$

$$g = c \tag{13}$$

$$h = d \tag{14}$$

$$e/f = a/b. \tag{15}$$

The time-delay member 25 serves to recreate the dynamics of the valve control unit 7. What is achieved thereby is that the signal FEV output by the time-delay member 25 is synchronized with the piston force FK. The time-delay member 25 can be embodied as required, to the extent that it brings about the desired functionality. As a rule, the time-delay member 25 is embodied as PT2 member.

The adjustment force F' is fed to a node 27. Furthermore, the inherent force FE is fed to the node 27. In the node 27, the adjustment force F' and the inherent force FE are added to form the setpoint piston force FKL. The control device 11 therefore establishes the setpoint piston force FKL on the basis of the inherent force FE and the adjustment force F'.

Figure 6:
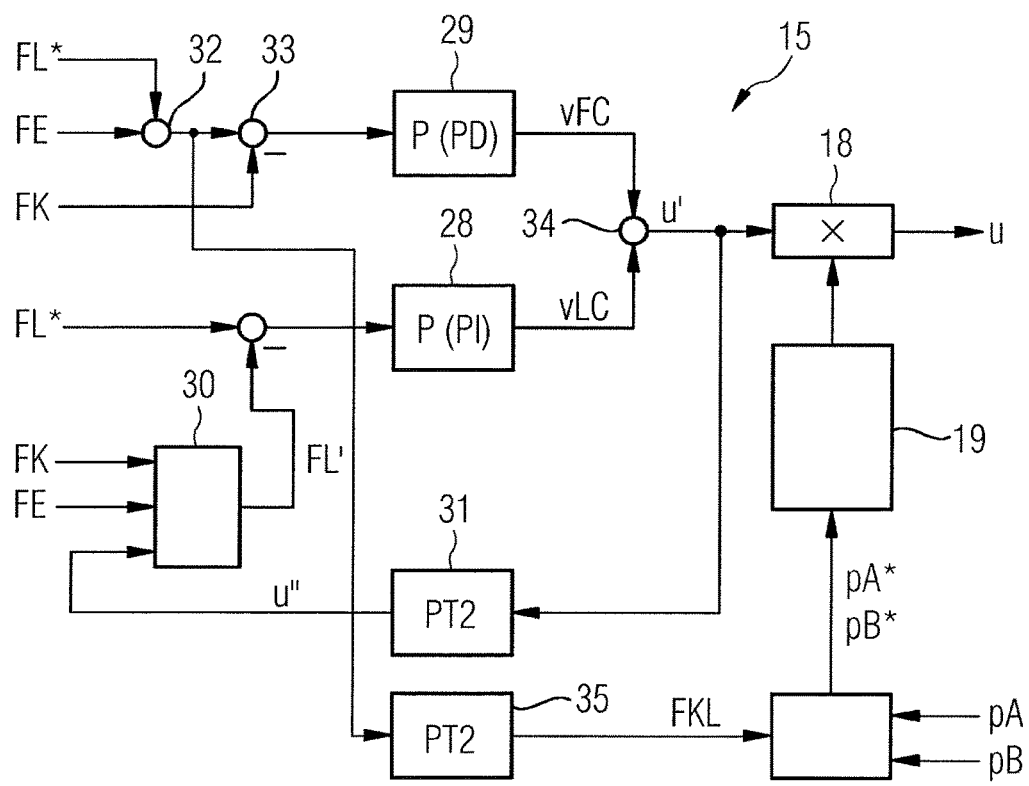
FIG. 6 shows a possible configuration of the control device in the case of a force control.

FIG. 6 shows a possible configuration of the control device 11 for the case where the setpoint variable g* is a setpoint load force FL*. In the case of the configuration of FIG. 6, the controller 15 acts as a force controller. The controller 15 is used to control an actual load force, which the hydraulic cylinder unit 1 exerts on a load by way of a mechanical system, as actual variable g. Like in the configuration in accordance with FIG. 5 as well, a piston force FK acting on the piston 3 is the force which is exerted by the hydraulic cylinder unit 1 onto the piston 3. It emerges from the effective piston faces AKA, AKB of the piston 3 and the working pressures pA, pB acting on the effective faces AKA, AKB. The setpoint load force FL* is the force which should be exerted by the piston 3 onto a load actuated by the piston 3.

In accordance with FIG. 6, the controller 15 comprises a load force controller 28, a force controller 29, a load observer 30 and a time-delay member 31.

The setpoint load force FL* and an expected actual load force FL'—i.e. a value for the actual load force established by computation—are fed to the load force controller 28. The expected actual load force FL' is established by the load observer 30.

The load force controller 28 controls the load force. To this end, the load force controller 28 establishes an output signal vLC, referred to as load output signal below, on the basis of the difference between setpoint load force FL* and expected actual load force FL'. The load force controller 28 is usually embodied as a P controller or PI controller.

The time-delay member 31 recreates the dynamics of the valve control unit 7. What is achieved thereby is that the delayed summed signal vU is synchronized with the piston force FK. The time-delay member 31 can be embodied as required, to the extent that it brings about the functionality just mentioned above. As a rule, the time-delay member 31 is embodied as PT2 member.

Two nodes 32, 33 are disposed upstream of the force controller 29. An inherent force FE is added to the setpoint load force FL* in the node 32. Like in the embodiment in accordance with FIG. 5 as well, the inherent force FE takes account of, in particular, the weight force which is determined by an inherent weight of the mass moved by means of the piston 3. In the node 33, the piston force FK is subtracted from this sum. The output signal of the node 33 is fed to the force controller 29. The force controller 29 establishes an output signal vFC, which is referred to as force controller output signal below. The force controller 29 is usually embodied as a P controller or as a PD controller. The force controller 29 stabilizes the control and enables higher dynamics.

The output signals vLC, vFC of the load force controller 28 and of the force controller 29 are summed in a node 34 to form the preliminary manipulated variable u'. The preliminary manipulated variable u' is fed to the linearization unit 17, which linearizes the preliminary manipulated variable u'. The linearization unit 17 is disposed immediately upstream of the valve control unit 7. It compensates—see the embodiments in relation to FIGS. 1, 2 and 4—nonlinearities of the hydraulic system.

The piston force FK, the inherent force FE and a delayed manipulated variable u'' are fed to the load observer 30 so that the load observer 30 is able to establish the expected actual load force FL'. The delayed manipulated variable u'' is established by means of the time-delay member 31 by delaying the preliminary manipulated variable u'.

In accordance with FIG. 6, the sum of setpoint load force FL* and inherent force FE is fed to the setpoint value establishment unit 20 as setpoint piston force FKL. The control device 11 therefore establishes the setpoint piston force FKL on the basis of the inherent force FE and the setpoint variable FL*.

Preferably, the sum of setpoint load force FL* and inherent force FE is not fed directly to the setpoint value establishment unit 20, but instead delayed by means of a time-delay member 35 prior thereto. The time-delay member 35 reproduces the dynamics of the control without the dynamics of the valve control unit 7. What this achieves is that the setpoint piston force FKL is synchronized with the piston force FK. The time-delay member 35 can be embodied as required, to the extent that it brings about the functionality just mentioned above. As a rule, the time-delay member 35 is embodied as PT2 member.

The load observer 30 may likewise be embodied as required. What is decisive is that it recreates the actual load force. Therefore, the load observer 30 acts as a corresponding soft sensor which recreates the actual load force, which is not measured, on the basis of (at least) one measured variable (namely the piston force FK). The setup and mode of operation of the load observer 30 are known, in general, to persons skilled in the art. There are a number of options for the implementation thereof; these are likewise known to persons skilled in the art. A configuration as is explained in WO 2011/000 856 A2 in conjunction with FIG. 3 therein is preferable.

The sum of the setpoint values pA*, pB* weighted by the effective working faces AKA, AKB of the piston 3 corresponds to the setpoint piston force FKL. Thus, the following relationship applies:

$$FKL = pA^* \cdot AKA + pB^* \cdot AKB. \tag{16}$$

However, a single equation—in this case equation 16—is not sufficient to determine two unknown variables—the setpoint values pA*, pB* in this case. Therefore, a further condition is required in order to be able to uniquely determine the setpoint values pA*, pB*. One option for uniquely determining the setpoint values pA*, pB* consists of the control device 11 establishing the setpoint values pA*, pB* for the working pressures pA, pB prevailing on both sides of the piston 3 in such a way that the sum of the setpoint values pA*, pB* equals a linear combination of the sum of the working pressures pA, pB prevailing on both sides of the piston 3 and the sum of the working pressures pP, pT prevailing on the inflow side and outflow side of the valve control unit 7. Thus, in this case, the following relationship applies as additional condition:

$$pA^* + pB^* = \alpha \cdot (pA + pB) + (1-\alpha) \cdot (pP + pT). \tag{17}$$

α is a weighting factor, which has a minimum of 0 and a maximum of 1. If the weighting factor α assumes the value 1, the setpoint value establishment unit 20 establishes the setpoint values pA*, pB* for the working pressures pA, pB prevailing on both sides of the piston 3 only on the basis of the setpoint piston force FKL and the working pressures pA, pB prevailing on both sides of the piston 3. For any other value of the weighting factor α, the setpoint value establishment unit 20 additionally—or, in the case where the weighting factor α has a value of 0, alternatively—takes account of the working pressures pP, pT prevailing on the inflow side and outflow side of the valve control unit 7. A possible structure for establishing the setpoint values pA*, pB* for the case where the sum of the setpoint values pA*, pB* equals the sum of the working pressures pA, pB prevailing on both sides of the piston 3 is depicted in FIG. 7.

Figure 7:
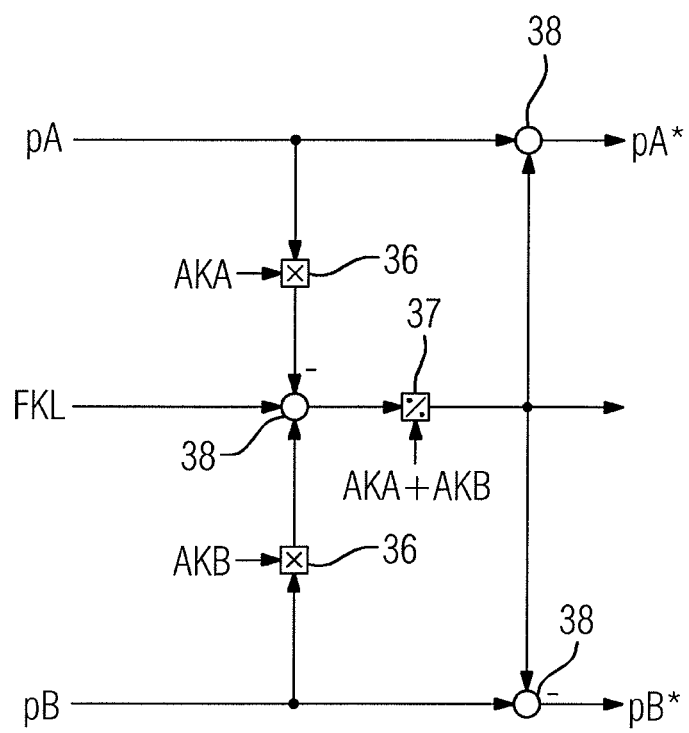
FIG. 7 shows a possible configuration of a setpoint value establishment unit.

In accordance with FIG. 7, the structure has two multipliers 36, one divider 37 and three nodes 38. The multipliers 36 multiply the input signals pA and AKA, or pB and AKB, fed thereto with one another. The divider 37 divides the input signal $$FKL - pA \cdot AKA + pB \cdot AKB \tag{18}$$

fed thereto by the sum of the effective working faces AKA, AKB. The nodes 38 form the sum of the input signals fed thereto. To the extent that an input signal is provided with a negative sign, the respective input signal is included negatively in the sun, i.e. it is subtracted. The setpoint values PA*, pB* are output at the outputs of the structure. Hence, the setpoint values pA*, pB* emerge as $$pA^* = pA + \frac{FKL - pA \cdot AKA + pB \cdot AKB}{AKA + AKB} \tag{19}$$

$$pB^* = pB - \frac{FKL - pA \cdot AKA + pB \cdot AKB}{AKA + AKB}. \tag{20}$$

These equations can be rewritten as:

$$pA^* = \frac{(pA + pB) \cdot AKB + FKL}{AKA + AKB} \quad (21)$$

$$pB^* = \frac{(pA + pB) \cdot AKA - FKL}{AKA + AKB}. \quad (22)$$

Figure 8:
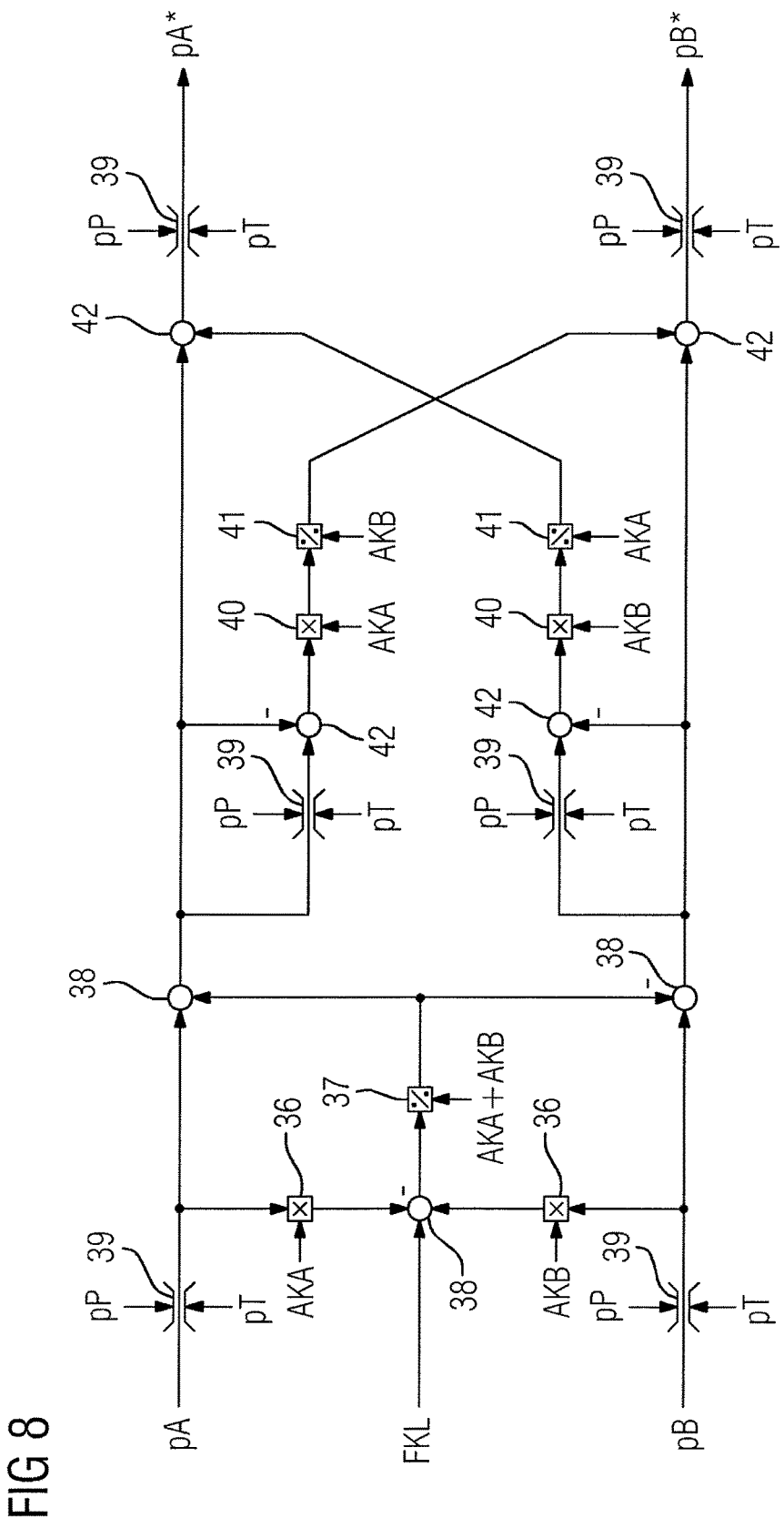
FIG. 8 shows a further possible configuration of a setpoint value establishment unit.

A further configuration of FIG. 7 is shown in FIG. 8. What is achieved by means of the configuration of FIG. 8 is that the control device 11 restricts the setpoint values pA*, pB* for the working pressures pA, pB prevailing on both sides of the piston 3 to values between the working pressures pT, pP prevailing on the inflow side and outflow side of the valve control unit 7.

In accordance with FIG. 8, limiters 39 are present on the input side of the structure and on the output side, as well as within the structure. By way of the limiters 39, the signal passing through the respective limiter 39 is limited to a value between the reservoir pressure pT and the pump pressure pP. Furthermore, further multipliers 40 are present in addition to the multipliers 36, further dividers 41 present in addition to the divider 37 and further nodes 42 are present in addition to the nodes 38. The function and mode of operation emerge directly from the illustration in FIG. 8.

Figure 9:
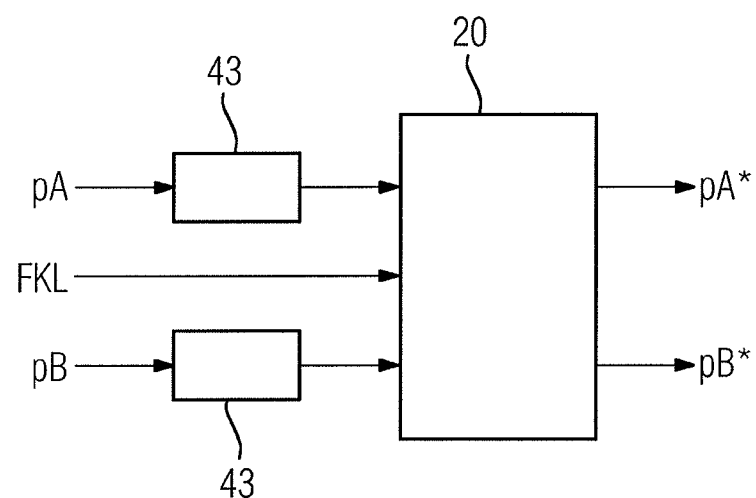
FIG. 9 shows a setpoint value establishment unit and smoothing members.

It is possible to feed the working pressures pA, pB prevailing on both sides of the piston 3 directly to the setpoint value establishment unit 20. However, smoothing members 43 are preferably disposed upstream of the setpoint value establishment unit 20 in accordance with the illustration in FIG. 9. The working pressures pA, pB are smoothed by means of the smoothing members 43. A smoothing time constant of the smoothing members 43 may lie between 10 ms and 1000 ms, for example between 30 ms and 300 ms. In trials, a value of approximately 100 ms was found to be advantageous.

The invention was explained above in conjunction with a hydraulic cylinder unit 1, in which the setpoint variable g* and the actual variable g are translational variables. However, the invention is likewise applicable if the setpoint variable g* and the actual variable g are rotational variables. In this case, travels should be replaced by corresponding angles and forces by corresponding torques.

The present invention has a number of advantages. In particular, the risk of vibrations is significantly reduced because although vibrations lead to an anti-phase oscillation of the working pressures pA, pB, it is only the sum of the working pressures pA, pB which is included in the equations for establishing the setpoint values pA*, pB*—see, in particular, equations 21 and 22—and hence also the linearization factor SF. Smoothing the working pressures pA, pB leads to a further pacification of the system.

In conclusion, the present invention therefore relates to the following circumstances:

A controller 15 receives a setpoint variable g* related to a piston 3 of the hydraulic cylinder unit 1 and an actual variable g related to the piston 3 of the hydraulic cylinder unit 1. On the basis of the difference δg thereof, said controller establishes a preliminary manipulated variable u'. A linearization unit 17 disposed downstream of the controller 15 multiplies the preliminary manipulated variable u' by a linearization factor F and outputs the product as final manipulated variable u to a valve control unit 7 such that the piston 3 of the hydraulic cylinder unit 1 is adjusted with an adjustment speed v. The linearization unit 17 establishes setpoint values pA*, pB* for the working pressures pA, pB on the basis of working pressures pA, pB prevailing on both sides of the piston 3 and/or working pressures pP, pT prevailing on the inflow side and outflow side of the valve control unit 7 and a setpoint piston force FKL to be exerted by the piston 3. It determines the linearization factor F dynamically as a function of an actual position s of the piston 3, the setpoint values pA*, pB* and the working pressures pP, pT prevailing on the inflow side and outflow side of the valve control unit 7.

Even though the invention was illustrated more closely and described in detail by the preferred exemplary embodiment, the invention is not restricted by the disclosed examples and other variants may be derived therefrom by a person skilled in the art without departing from the scope of protection of the invention.

The invention claimed is:

1. A control device for controlling a hydraulic cylinder unit comprising:
   a controller having an input side which is configured to receive on the input side, a setpoint variable (g*) related to a piston of the hydraulic cylinder unit and to receive an actual variable (g) related to the piston of the hydraulic cylinder unit and to establish a preliminary manipulated variable (u') for a valve control unit of the hydraulic cylinder unit based on a difference (δg) between the setpoint variable (g*) and the actual variable (g);
   a linearization unit disposed downstream of the controller and configured for multiplying the preliminary manipulated variable (u') by a linearization factor (F) and for outputting the preliminary manipulated variable (u') multiplied by the linearization factor (F) to the valve control unit as a final manipulated variable (u) such that the actual variable (g) tracks the setpoint variable (g*) with an adjustment speed;
   the linearization unit is configured for establishing the setpoint values (pA*, pB*) for the working pressures (pA, pB) prevailing on both sides of the piston based on working pressures (pA, pB) prevailing on at least one of both sides of the piston and working pressures (pP, pT) prevailing on the inflow side and an outflow side of the valve control unit and a setpoint piston force (FKL) to be exerted by the piston; and
   the linearization unit is configured to dynamically determine the linearization factor (F) as a function of an actual position(s) of the piston, the setpoint values (pA*, pB*) for the working pressures (pA, pB) prevailing on both sides of the piston and the working pressures (pP, pT) prevailing on the inflow side and outflow side of the valve control unit.

2. The control device as claimed in claim 1, wherein the controller is embodied as a P controller.

3. A control device for controlling a hydraulic cylinder unit comprising:
   a controller embodied as a P controller, the controller is configured to receive a controlled variable (δg') on an input side to establish a manipulated variable (u) for a valve control unit of the hydraulic cylinder unit based on the controlled variable (δg'), and the controller is configured to output the manipulated variable (u) to the valve control unit such that an actual variable (g) relating to a piston of the hydraulic cylinder unit tracks a setpoint variable (g*) relating to the piston of the hydraulic cylinder unit with an adjustment speed;
   a linearization unit disposed upstream of the controller and which receives the setpoint variable (g*) and the actual variable (g), the linearization unit is configured for multiplying the difference thereof (δg) by a linearization factor (F) and for outputting the difference (δg) multiplied by the linearization factor (F) as controlled variable (δg') to the controller;

the linearization unit is configured to establish setpoint values (pA*, pB*) for the working pressures (pA, pB) prevailing on both sides of the piston based on working pressures (pA, pB) prevailing on both sides of the piston and/or working pressures (pP, pT) prevailing on the inflow side and outflow side of the valve control unit and a setpoint piston force (FKL) to be exerted by the piston; and the linearization unit is configured to dynamically determine the linearization factor (F) as a function of an actual position(s) of the piston, the setpoint values (pA*, pB*) for the working pressures (pA, pB) prevailing on both sides of the piston and the working pressures (pP, pT) prevailing on the inflow side and outflow side of the valve control unit.

4. The control device as claimed in claim 1, further comprising the setpoint variable (g*) and the actual variable (g) are positions (s*, s) of the piston of the hydraulic cylinder unit and the control device is configured to establish the setpoint piston force (FKL) on the basis of an inherent force (FE) and an adjustment force (F'), wherein the inherent force (FE) is determined by an inherent weight of a mass moved by means of the piston and the control device is configured to establish the adjustment force (F') on the basis of a variable (vK*) output by the controller, from which the preliminary manipulated variable (u') or the final manipulated variable (u) is established by filtering.

5. The control device as claimed in claim 1 wherein the setpoint variable (g*) is a setpoint load force (FL*), the actual variable (g) is an actual load force exerted by the hydraulic cylinder unit onto a load, the control device is configured to establish the setpoint piston force (FKL) on the basis of an inherent force (FE) and the setpoint variable (g*), and the inherent force (FE) is determined by an inherent weight of a mass moved by the piston.

6. The control device as claimed in claim 5, further comprising the control device is configured to establish a non-delayed force setpoint value based on the inherent force (FE) and the setpoint variable (g*) and the control device is configured to establish the setpoint piston force (FKL) by delaying the non-delayed force setpoint value by means of a time-delay member.

7. The control device as claimed in claim 1, further comprising the control device is configured to establish the setpoint values (pA*, pB*) for the working pressures (pA, pB) prevailing on both sides of the piston such that the sum of the setpoint values (pA*, pB*) equals a linear combination of the sum of the working pressures (pA, pB) prevailing on both sides of the piston and the sum of the working pressures (pP, pT) prevailing on the inflow side and outflow side of the valve control unit.

8. The control device as claimed in claim 1, further comprising the control device is configured to restrict the setpoint values (pA*, pB*) for the working pressures (pA, pB) prevailing on both sides of the piston to values between the working pressures (pT, pP) prevailing on the inflow side and outflow side of the valve control unit.

9. The control device as claimed in claim 1, further comprising the control device is configured to smooth the working pressures (pA, pB) prevailing on both sides of the piston before establishing the setpoint values (pA*, pB*) for the working pressures (pA, pB) prevailing on both sides of the piston.

10. The control device as claimed in claim 1, embodied as a software programmable control device comprising program code stored non-volatilely in the module, and the program code being configured to the control device.

11. The control device as claimed in claim 3, further comprising the setpoint variable (g*) and the actual variable (g) are positions (s*, s) of the piston of the hydraulic cylinder unit and the control device is configured to establish the setpoint piston force (FKL) on the basis of an inherent force (FE) and an adjustment force (F'), wherein the inherent force (FE) is determined by an inherent weight of a mass moved by means of the piston and the control device is configured to establish the adjustment force (F') on the basis of a variable (vK*) output by the controller, from which the preliminary manipulated variable (u') or the final manipulated variable (u) is established by filtering.

12. The control device as claimed in claim 3, wherein the setpoint variable (g*) is a setpoint load force (FL*), the actual variable (g) is an actual load force exerted by the hydraulic cylinder unit onto a load, the control device is configured to establish the setpoint piston force (FKL) on the basis of an inherent force (FE) and the setpoint variable (g*), and the inherent force (FE) is determined by an inherent weight of a mass moved by the piston.

13. The control device as claimed in claim 3, further comprising the control device is configured to establish the setpoint values (pA*, pB*) for the working pressures (pA, pB) prevailing on both sides of the piston such that the sum of the setpoint values (pA*, pB*) equals a linear combination of the sum of the working pressures (pA, pB) prevailing on both sides of the piston and the sum of the working pressures (pP, pT) prevailing on the inflow side and outflow side of the valve control unit.

* * * * *